United States Patent [19]
Sears

[11] Patent Number: 6,029,947
[45] Date of Patent: Feb. 29, 2000

[54] SAFETY VALVE FOR FIRE SUPPRESSION DEVICE

[75] Inventor: Richard F. Sears, Kenley, N.C.

[73] Assignee: Kidde Technologies, Inc., Wilson, N.C.

[21] Appl. No.: 09/121,347

[22] Filed: Jul. 23, 1998

[51] Int. Cl.[7] .................................................. F16L 37/28
[52] U.S. Cl. ........................... 251/149.1; 251/67; 251/68
[58] Field of Search .............................. 251/149.1, 149.6, 251/67, 68; 137/513.5

[56] References Cited

U.S. PATENT DOCUMENTS

| | | | |
|---|---|---|---|
| 3,841,349 | 10/1974 | Todd | 137/513.5 |
| 4,579,315 | 4/1986 | Kowalski . | |
| 4,691,736 | 9/1987 | Kowalski . | |
| 5,577,706 | 11/1996 | King | 251/149.6 |
| 5,582,201 | 12/1996 | Lee et al. | 251/149.6 X |

Primary Examiner—Kevin Lee
Attorney, Agent, or Firm—Leydig, Voit & Mayer, Ltd

[57] ABSTRACT

A fire suppression valve for use with a cannister of fire suppression material. The valve has a safety shuttle valve located in a discharge port for preventing unintended discharge of fire suppression material in the absence of connection to a discharge hose. The shuttle valve has an actuating surface and a body portion with shuttle ports. An outside end of the body portion projects into an outlet connection sized to receive the discharge hose. When the hose is connected, it abuts the outside end to support the shuttle valve in an open position. When the hose is removed, the shuttle valve is free to slide to a closed position, in which the actuating surface substantially blocks the discharge port. Accordingly, when the valve is triggered without an attached hose, the pressurized suppression material pushes against the actuating surface to move the shuttle valve to the closed position.

13 Claims, 3 Drawing Sheets

SAFETY VALVE FOR FIRE SUPPRESSION DEVICE

FIELD OF THE INVENTION

The present invention generally relates to fire suppression devices, and more particularly relates to safety valves for such devices.

BACKGROUND OF THE INVENTION

A typical fire suppression device comprises a cannister of pressurized fire suppression material and a valve. The fire suppression material in the cannister may include a propellant, if necessary, to discharge the fire suppression material. The valve has an outlet port through which suppression material from the cannister is discharged. The valve typically has a valve member or piston which moves inside a central chamber between a closed position, in which the suppression material is prevented from reaching the outlet port, and an open position, in which the suppression material is released. The piston is normally latched in the closed position to resist a pressure force from the pressurized suppression material. The latch may be selectively released, allowing the pressure on the piston to displace it, opening the discharge port which it had blocked.

A substantial concern with such fire suppression devices is the unintended discharge of fire suppression material. It will be appreciated that such devices are designed for rapid release of pressurized suppression material. Accordingly, fire suppression devices employ a variety of highly responsive trigger mechanisms, such as manual pulls or sensitive solenoid actuators. Regardless of the mechanism, a danger exists of accidental or unintended triggering of the device which releases the fire suppression material. Accidental discharges waste suppression material and require cleanup and recharging of the devices.

More significantly, personal injury or death may result when a fire suppression device accidentally discharges in the vicinity of personnel. In certain applications, such as use inside the Bradley fighting vehicle, fire suppression devices are installed in fixtures attached to the vehicle. The fixtures incorporate a hose for directing discharge of suppression material. Accordingly, it is important to prevent unintended discharge during transport and installation, since such discharge may cause injury or death to the handler. The relatively compact interior of the Bradley fighting vehicle increases the chances of such discharge striking personnel.

Certain fire suppression devices incorporate safeties which do not adequately protect against accidental discharge of suppression material. The safeties used in these devices focus on preventing a trigger mechanism from operating. For example, some devices employ a safety pin which locks a mechanical pull trigger in position to prevent operation. Safety pins, however, do not prevent unintended actuation of non-mechanical type trigger mechanisms, such as solenoid-actuated mechanisms. Furthermore, the mechanical safety does not protect against discharge due to internal failure of the valve. In addition, the pin must first be removed before the trigger mechanism can operate to release suppression material. Accordingly, such safeties are not suitable for applications requiring instantaneous discharge, as in military applications where advanced sensors can trigger highly responsive extinguishers to provide important life-saving functionality. Furthermore, most conventional safeties require manual manipulation by the user to set.

SUMMARY OF THE INVENTION

A general aim of the present invention is to provide a fire suppression valve which is safer to handle and use near personnel.

In that regard, it is an object of the present invention to provide a valve which automatically prevents unintended discharge of fire suppression material until the device is installed.

Another object of the present invention is to provide a valve which automatically prevents discharge of suppression material regardless of how the valve is triggered.

Further in that regard, it is an object of the present invention to provide a valve which automatically prevents discharge of suppression material in the event of internal failure of the valve.

Yet another object of the present invention is to provide a valve with a safety device that does not detract from the response time of the valve.

In light of the above, it is a feature of the present invention to provide a valve for use with a cannister of pressurized fire suppression material having a shuttle valve disposed inside a discharge port. The valve has an inlet connection for attachment to the cannister. The inlet connection communicates with an outlet chamber having a discharge port. The outlet chamber leads to an outlet connection which is sized for attachment to a discharge hose. The shuttle valve has a body portion sized to slidingly fit inside the discharge port. An outside end of the body portion projects inside the outlet connection. When inserted in the outlet connection, the discharge hose engages the outside end to support the shuttle valve in an open position. In the open position, shuttle ports extending through the body portion are exposed to the outlet chamber to thereby allow discharge of suppression material.

An actuating surface is located at an inside end of the shuttle valve. The actuating surface is sized to substantially block the discharge port. When the discharge hose is disconnected, the shuttle valve is free to slide outwardly toward a closed position. Accordingly, if the valve is triggered without the discharge hose, the pressurized suppression material pushes on the actuating surface and moves the shuttle valve toward the closed position. In the closed position, the gaseous propellant portion of the suppression material slowly leaks out the discharge port, thereby avoiding rapid discharge, which poses a safety threat to personnel.

These and other objects and advantages of the invention will become more apparent from the following detailed description when taken in conjunction with the accompanying drawings.

Figure 1:
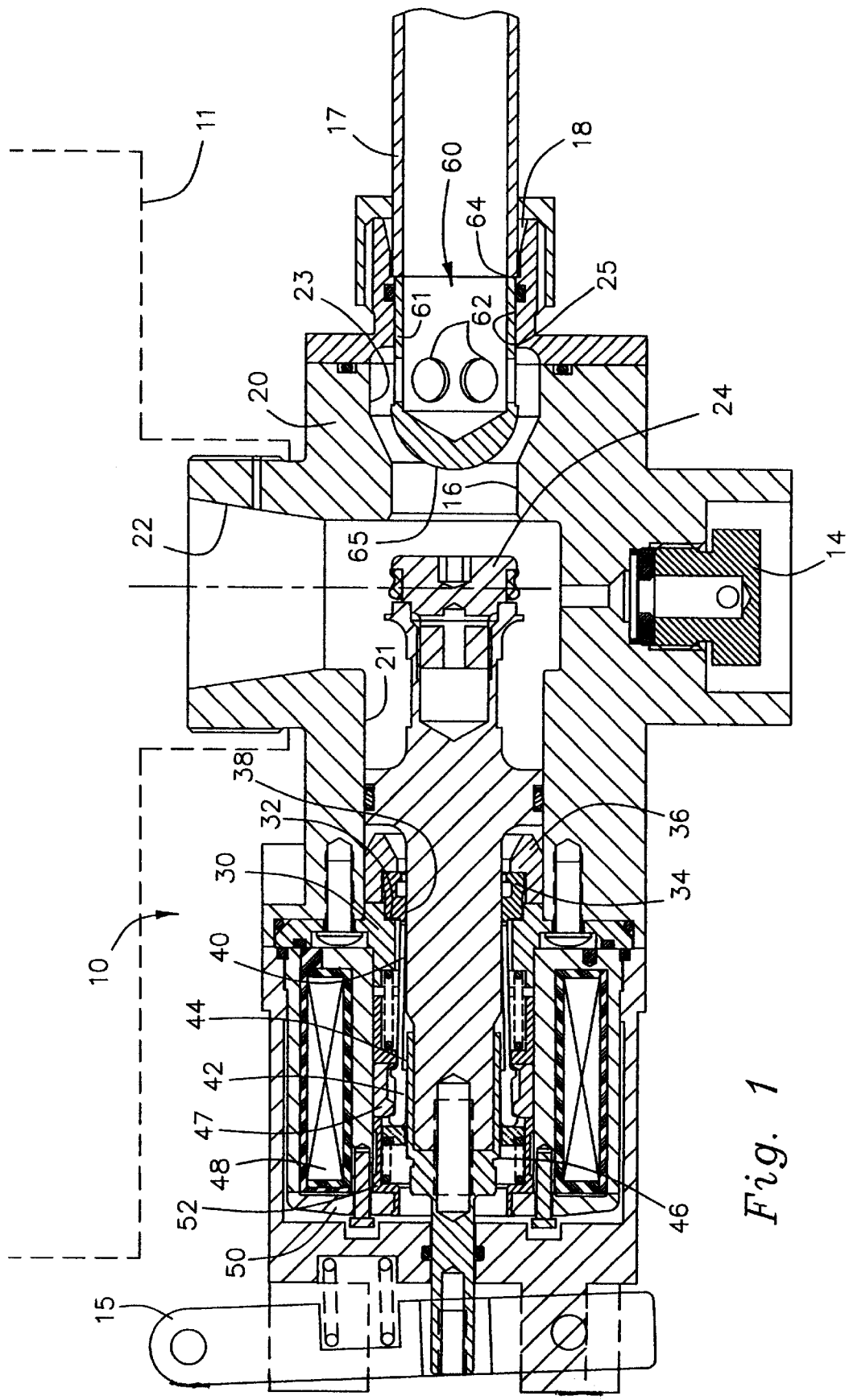
FIG. 1 is a sectional view of a valve in accordance with the present invention with the shuttle valve in the open position.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
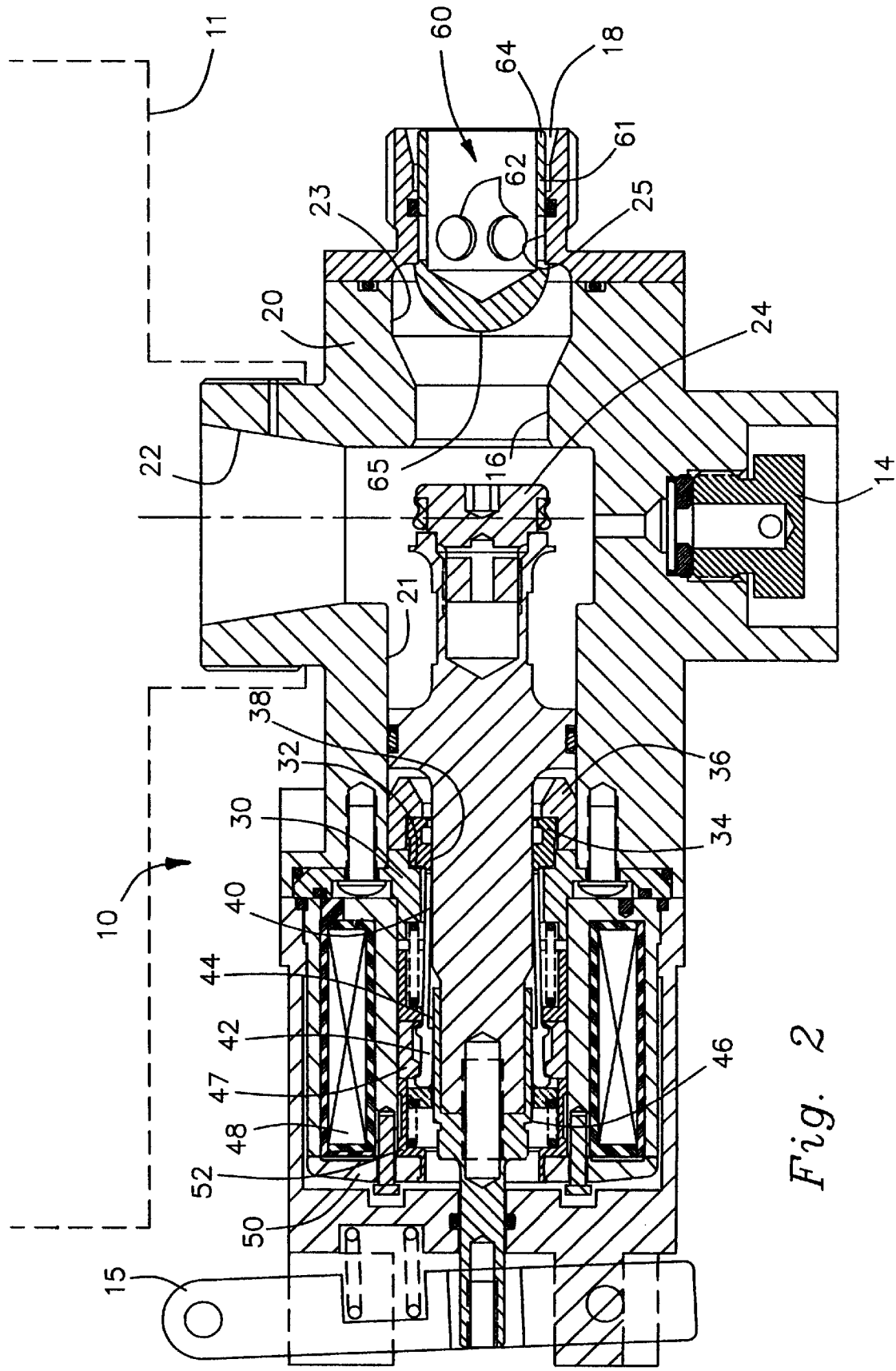
FIG. 2 is a sectional view similar to FIG. 1 showing the shuttle valve in the closed position.

Referring now to the drawings, and specifically FIGS. 1 and 2, a fire suppression valve 10 is shown attached to a cannister 11, illustrated in broken lines. The cannister 11 holds fire suppression material. As used herein, fire suppression material encompasses a wide variety of materials used to extinguish fires. For example, the material may take the form of a dry powder or a vaporizing liquid agent (such as Halon 1301, HFC 227ea, or HFC 236fa). Fire suppression materials also may include propellants, such as nitrogen gas, which help pressurize the suppression material. According to the illustrated embodiment, the valve 10 includes a thermal pressure relief assembly 14 and a solenoid-actuated trigger mechanism for discharging the contents of the cannister 11 through a discharge port 25. Manual means 15 are also provided for triggering the valve. A discharge hose 17 (FIGS. 1 and 3) is attached to an outlet connection 18 and defines a discharge path from the valve 10. In certain embodiments, the discharge hose 17 is a part of a discharge fixture permanently secured in place.

Referring to the valve 10 in greater detail, it will be seen that the valve has a valve housing 20. The valve housing 20 has an inlet connection 22 for attachment to the cannister 11. The inlet connection 22 communicates with a central chamber 21. In the illustrated embodiment, the central chamber 21 has an outlet port 16 leading to an outlet chamber 23. Access to the outlet chamber 23 is controlled by the position of a piston 24 supported for axial movement inside the central chamber 21. For example, in a closed position the piston 24 engages the outlet port 16 to block flow of suppression material to the outlet chamber 23. In an open position, the piston 24 is spaced from the outlet port 16 to release suppression material to the outlet chamber.

According to the illustrated embodiment, the outlet chamber 23 leads to the discharge port 25. The outlet connection 18 is connected to the discharge port 25 and receives the discharge hose 17. In operation, therefore, it will be appreciated that the piston 24, in the closed position, seals with the outlet port 16 to prevent release of suppression material. With the piston 24 in the open position, pressurized suppression material flows from the inlet connection 22 through the central chamber 21, outlet port 16 outlet chamber 23, and discharge port 25 to the hose 17 for discharge. While the illustrated embodiment depicts a valve 10 in which the suppression material is introduced at a midpoint of the piston 24, it will be appreciated by those skilled in this art that other valve configurations may also be used, including the more conventional arrangement which introduces suppression material at the end of the piston 24.

The valve housing 20 has a trigger mechanism for releasably latching the piston 24 in the closed position. As best shown in FIGS. 1 and 2, a retaining plate 30 is fastened to the valve housing 20 having a locating shoulder 32 sized to receive a collet 34. The retaining plate 30 also supports an annular buffer 36 formed of elastomeric material. The collet 34 has an inner bore 38 which provides radial piloting support for the body of the piston 24. The collet 34 also has a plurality of elongated collet fingers 40. Each collet finger 40 has an enlarged lower end 42 which will be understood to be radially displaceable as a result of compliant flexibility along the length of each finger. The lower end 42 of each collet finger 40 has an inner shoulder 44 projecting radially inwardly. The piston 24 has an abutment 46 shaped to complement the inner shoulders 44. Accordingly, when engaged, the inner shoulders 44 act against the abutment 46 to hold the piston in the closed position. An outer sleeve 47 is positioned to confine the lower ends 42 of the collet fingers 40 to thereby resist the pressure force of the suppression material which urges the piston 24 toward the open position.

The trigger mechanism may be actuated to unlock the piston and allow it to move toward the open position. As illustrated in FIGS. 1 and 2, a solenoid 48 which controls the location of an armature plate 50. The armature plate 50 is axially supported by an armature stem 52 attached thereto. The armature stem 52 engages the outer sleeve 47 so that the position of the armature plate 50 influences the position of the outer sleeve. In the normal, closed position, the armature plate 50 is spaced from the solenoid 48 so that the outer sleeve 47 confines the lower ends 42 of the collet fingers 40, as shown in FIG. 2. When the solenoid 48 is energized, the armature plate 50 is pulled toward the solenoid, thereby pushing the outer sleeve 47 via the armature stem 52. In this position, the outer sleeve 47 no longer confines the lower ends 42 of the collet fingers 40. The flexibility of the elongate collet fingers 40 allows the lower ends 42 to shift radially outwardly under the pressure force exerted on the piston, thereby allowing the abutment 46 of the piston to slide past the inner shoulder 44 of the collet fingers 40. The piston 24 is then free to move past the collet 34 until the shoulder engages the buffer 36, thereby defining the open position. It will be appreciated that the piston 24 is shown in the open position in FIGS. 1–3. Those skilled in this art will appreciate that this structure provides a quick trigger mechanism which rapidly opens an outlet port of relatively substantial size, for rapid release of fire suppression material. Other trigger mechanisms known in the art may also be used. In addition, as illustrated in FIGS. 1 and 2, the manual means 15 may be used to trigger the valve.

Figure 3:
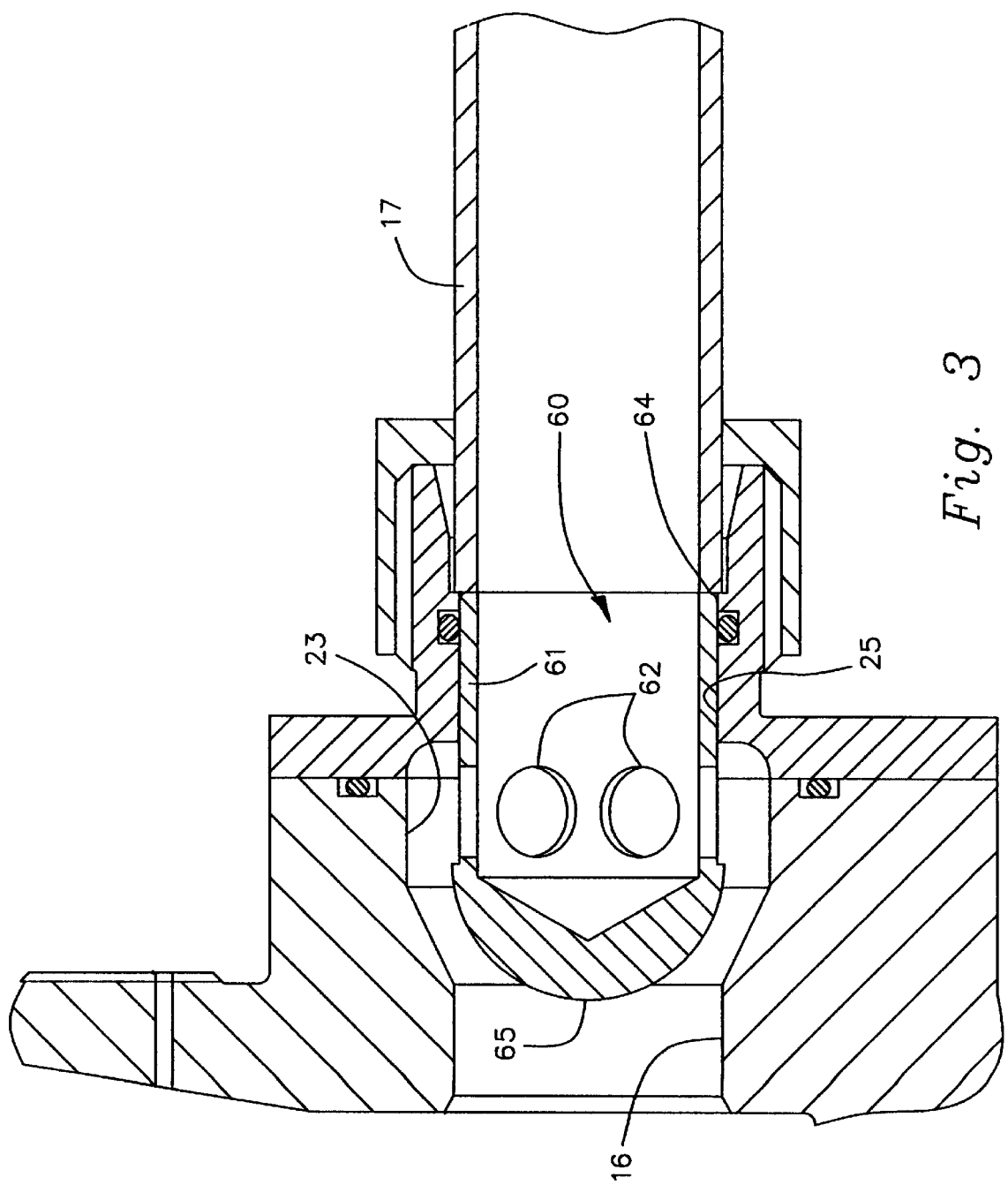
FIG. 3 is an enlarged view of an outlet area of the valve including the shuttle valve.

In accordance with certain aspects of the present invention, a shuttle valve 60 is disposed inside the discharge port 25. As best shown in FIG. 3, the shuttle valve 60 has a hollow body portion 61 which closely fits the discharge port 25. Shuttle ports 62 extend through the body portion 61 near an inside end having an actuating surface 65, while an opposite, outside end 64 projects into the outlet connection 18. The body portion 61 is sized to allow sliding through the discharge port 25 between open and closed positions.

When the discharge hose 17 is inserted into the outlet connection 18, the shuttle valve 60 is supported in the open position, exposing the shuttle ports 62 to the outlet chamber 23 (FIGS. 1 and 3). With the hose 17 disconnected, the shuttle valve 60 is free to slide outwardly to the closed position, in which the actuating surface 65 of the shuttle valve 60 substantially blocks the discharge port 25. Accordingly, when the valve 10 is actuated without a discharge hose 17, the pressurized suppression material acts on the actuating surface 65 to push the shuttle valve 60 toward the closed position, thereby preventing rapid discharge of suppression material. The outlet chamber 23 is sized larger than the discharge port 25 to accommodate the actuating surface 65.

It will be understood that, in the closed position, the shuttle valve 60 of the present invention restricts flow of suppression material to a safe level. Thus, while the shuttle valve 60 prevents rapid (and potentially injurious) discharge, it does allow minimal flow of suppression material. As noted above, the actuating surface 65 substantially blocks the discharge port 25. The actuating surface 65 does not, however, completely seal with the discharge port 25 to block all flow of suppression material. Instead, the gaseous propellant portion of the suppression material is allowed to slowly leak out the valve 10. The relatively slow discharge allows the fire suppression device to reach a safe internal pressure so that the device may be reset and recharged with suppression material.

From the foregoing, it will be apparent that the present invention brings to the art a new and improved safety valve for a fire suppression device. The valve incorporates a shuttle valve in a discharge port to prevent unintended discharge of suppression material. The shuttle valve has a body portion which slides through the discharge port between open and closed positions. An outside end of the body portion projects into an outlet connection. An actuating surface is disposed at an inside end of the shuttle valve against which pressurized suppression material acts. Shuttle ports extend through the body portion near an inside end. When a discharge hose is inserted into the outlet connection, it abuts the outside end of the body portion to support the shuttle valve in the open position, in which shuttle ports are exposed to allow flow of suppression material. When the discharge hose is removed, the shuttle valve may slide toward the closed position, in which an actuating surface of the shuttle valve substantially blocks the discharge port, thereby preventing rapid discharge of suppression material. In the closed position, suppression material is allowed to slowly leak out the valve to reach an internal pressure at which the device may be safely reset and recharged.

What is claimed is:

1. A fire suppression valve for attachment to a cannister of pressurized fire suppression material, the valve comprising:

a housing having an inlet connection for attachment to the cannister, the inlet connection communicating with a discharge port, the discharge port having an outlet connection for receiving a discharge hose;

a triggerable valve interposed between the inlet and the discharge port and configured to provide rapid release of the fire suppression material when triggered;

a pressure-actuated safety valve located in the discharge port the safety valve having an actuating surface responsive to the pressurized fire suppression material when present to force the safety valve toward the closed position, the safety valve having an outside end projecting into the outlet connection, the discharge hose when connected abutting the outside end to support the safety valve in an open position, the safety valve formed so that, in the open position, pressurized fire suppression material is allowed to flow through to the discharge port and to act on the actuating surface of the safety valve, such that, when the discharge hose is not connected, the fire suppression material pushes the safety valve to the closed position to substantially restrict flow of fire suppression material to the discharge port.

2. The valve of claim 1 in which the safety valve has an actuating surface disposed at an inside end, the fire suppression material acting on the actuating surface to bias the safety valve toward the closed position.

3. The valve of claim 2 in which the actuating surface is sized to substantially block the discharge port, the actuating surface engaging the discharge port in the closed position to substantially restrict flow of fire suppression material.

4. The valve of claim 3 in which the housing has an outlet chamber immediately upstream of the discharge port, the outlet chamber sized larger than the discharge port to accommodate the actuating surface.

5. The valve of claim 1 in which the safety valve includes a body portion, the body portion closely fitting the discharge port to support the safety valve as it slides between the open and closed positions.

6. The valve of claim 1 in which at least one safety valve port extends through the safety valve near an inside end, the safety valve port accessible in the open position to allow flow of fire suppression material to the discharge port and concealed in the closed position to substantially restrict flow to the discharge port.

7. The valve of claim 1 in which the safety valve in the closed position, forms a seal which substantially restricts flow of fire suppression material but allows a portion of the fire suppression material to slowly escape.

8. A fire suppression valve adapted for use with a cannister containing a supply of pressurized fire suppression material, and a discharge hose, the valve comprising:

a housing having an inlet adapted to receive the cannister for supplying pressurized fire suppression material and an outlet adapted to receive the discharge hose, a discharge port associated with the outlet, the outlet fluidically connected to the inlet by a central chamber in the housing; and a triggerable valve blocking the fluidic connection between the central chamber and the outlet and configured to provide rapid release of the fire suppression material when triggered;

a safety valve having a body portion slidably mounted in the discharge port and sized to substantially block the discharge port from the central chamber, the safety valve having an actuating surface in the central chamber and responsive to the pressurized fire suppression material when present in the central chamber for forcing the safety valve toward its closed position, the body portion having safety valve ports extending therethrough in fluid communication with the discharge port, an outside end of the body portion extending into the outlet and adapted to engage the discharge hose such that the safety valve is held open when the discharge hose is present.

9. The valve of claim 8 in which the discharge port has a given diameter and the body portion of the shuttle valve is sized to slidingly engage the discharge port.

10. The valve of claim 8 in which the shuttle ports are disposed near the actuating surface.

11. The valve of claim 8 in which the body portion is substantially hollow.

12. The valve of claim 8 in which the actuating surface has a semi-spherical shape.

13. The valve of claim 8 in which the body portion is sized substantially similar to the size of the discharge hose.

* * * * *